(12) United States Patent
Yokota et al.

(10) Patent No.: US 6,304,657 B1
(45) Date of Patent: Oct. 16, 2001

(54) DATA ENCRYPTION APPARATUS USING ODD NUMBER OF SHIFT-ROTATIONS AND METHOD

(75) Inventors: Kaoru Yokota, Ashiya; Motoji Ohmori, Hirakata; Atsuko Miyaji, Ishikawa-ken, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/474,531

(22) Filed: Dec. 29, 1999

(30) Foreign Application Priority Data

May 26, 1999 (JP) ................................................. 11-146079

(51) Int. Cl.[7] ....................................................... H04L 9/28
(52) U.S. Cl. .............................. 380/28; 380/29; 380/259
(58) Field of Search .................................. 380/28, 259, 29

(56) References Cited

U.S. PATENT DOCUMENTS

| | | | |
|---|---|---|---|
| 4,157,454 | * 6/1979 | Becker | 178/22 |
| 4,255,811 | * 3/1981 | Adler | 375/2 |
| 5,003,597 | * 3/1991 | Merkle | 380/37 |
| 5,054,067 | * 10/1991 | Moroney et al. | 380/37 |
| 5,727,062 | * 3/1998 | Ritter | 380/37 |
| 5,790,675 | * 8/1998 | Patarin | 380/23 |

OTHER PUBLICATIONS

Zheng et al "On the Construction of Block Ciphers Provably Secure and Not Relying on Any Unproved Hypotheses", Advances in Cryptology, Crypto '89, Lecture Notes in Computer Science, vol. 435, pp. 461–480, Springer–Verlag, 1990.*

"Serpent: A new block cipher proposal," by E. Biham et al., Mar. 23–25, 1998, vol. 1372, pp. 222 to 238.

"The RC5 Encryption Algorithm,", by R.L. Rivest, Fast Software Encryption, International Workshop, 1995, pp. 86–95.

* cited by examiner

Primary Examiner—Gail Hayes
Assistant Examiner—Jeffrey S. Leaning
(74) Attorney, Agent, or Firm—Price and Gess

(57) ABSTRACT

A data converting unit includes a key adding unit for performing an arithmetic addition modulo $2^{32}$ for input data F and subkey data Ki and outputting the outcome as data G, and a data substituting unit for performing an exclusive-OR operation for corresponding bits in data Rot7(G) obtained by shift-rotating the data G by 7 bits toward higher-order bit positions, data Rot1(G) obtained by shift-rotating the data G by 1 bit toward higher-order bit positions, and the data G itself.

26 Claims, 12 Drawing Sheets

DATA ENCRYPTION APPARATUS USING ODD NUMBER OF SHIFT-ROTATIONS AND METHOD

This application is based on an application No. H11-146079 filed in Japan, the content of which is hereby incorporated by reference.

BACKGROUND OF THE INVENTION

1. Field of the Invention

The present invention relates to a data encryption apparatus and method, and in particular relates to a data encryption technique that employs shift-rotations.

2. Description of the Prior Art

With the rapid proliferation of digital communications in recent years, there has been the growing demand for highly secure data cryptosystems that can ensure confidentiality of data in communication, for the sake of development of sound industries and privacy protection. Not only high security but also high cryptographic speed and easy implementation in hardware and software are required of such cryptosystems.

First Conventional Technique

A pseudorandom number additive cipher is introduced below as the first example of conventional data cryptosystems.

In this cipher, the transmitter and the receiver share a secret key (hereinafter simply referred to as a "key"). Plaintext data M is divided into plaintext data blocks Mi of fixed length, and random number data R of the fixed length is generated for each plaintext data block Mi using the key as a seed.

Following this, an exclusive-OR operation is performed for corresponding bits in each plaintext data block Mi and the random number data R to generate a ciphertext data block Ci. This operation is expressed as $$Ci=Mi(+)R$$

where "(+)" denotes an exclusive-OR operation for corresponding bits.

Lastly, generated ciphertext data blocks Ci are linked together to form ciphertext data C.

This cipher can perform extremely fast encryption and therefore lends itself for cryptographic processing in real-time image and audio data communications.

However, the level of security afforded by the cipher is quite low. Given that the same key is used for all plaintext data blocks Mi, acquiring a pair of plaintext data block Mi and ciphertext data block Ci enables an unauthorized party to derive the random number data R from the following equation, as a result of which the other ciphertext data blocks Ci will be broken.

$$R=Mi(+)Ci$$

Second Conventional Technique

A block cipher is presented below as the second example of conventional data cryptosystems. Representatives of block ciphers are the Data Encryption Standard (DES) and the Fast Data Enciphermentt Algorithm (FEAL). For details on DES and FEAL, see Eiji Okamoto, *An Introduction to Encryption Theory*, Kyoritsu (1993).

Block ciphers handle 64-bit input and output data with their strong data shuffling abilities. One of such block ciphers is the MULTI2 cipher disclosed in Japanese Laid-Open Patent Application No. H1-276189.

FIG. 1 is a block diagram showing the construction of a data converting unit 40 as one of three data converting units equipped in a data encryption apparatus that employs the MULTI2 cipher.

This data converting unit 40 is roughly made up of a key adding unit 401, a first data substituting unit 402, and a second data substituting unit 403, and converts 32-bit input data A to 32-bit output data D based on 32-bit subkey data Ki.

To be more specific, once the input data A and the subkey data Ki have been inputted in the key adding unit 401, the key adding unit 401 performs an arithmetic addition modulo $2^{32}$ on the input data A and subkey data Ki and outputs the result as 32-bit data B. This is expressed as $$B=(A+Ki) \bmod 2^{32}$$

where "+" denotes an arithmetic addition and "$\alpha$ mod $\beta$" denotes the remainder after dividing $\alpha$ by $\beta$.

The first data substituting unit 402 receives the data B from the key adding unit 401 and performs an arithmetic addition modulo $2^{32}$ for data Rot2(B) obtained by shift-rotating the data B by 2 bits toward higher-order bit positions, the data B itself, and constant data "1". As a result, 32-bit data C is obtained. This can be written as $$C=(Rot2(B)+B+1) \bmod 2^{32}$$

where "Rot$\alpha$(X)" denotes a shift-rotation of 32-bit data X by $\alpha$ bits toward higher-order positions (and its result).

The second data substituting unit 403 receives the data C outputted from the first data substituting unit 402 and takes an exclusive-OR for corresponding bits in the data C and data Rot4(C) obtained by shift-rotating the data C by 4 bits toward higher-order positions, thereby generating the 32-bit output data D. This is expressed as $$D=Rot4(C) (+)C$$

Consequently, the 32-bit data D is outputted from the data converting unit 40.

Thus, the conventional data converting unit 40 performs data shuffling at high speed through the use of operations combined with various shift-rotations.

Nevertheless, the data converting unit 40 has the following security problems.

Suppose input data M1 and input data M2 that satisfy the relationship $$M1(+)M2=55555555h$$

are each inputted in the second data substituting unit 403, "h" representing hexadecimal notation.

Then $$Rot4(M1)(+)Rot4(M2)=Rot4(M1(+)M2)$$

due to linearity of the shift-rotation.

Also $$Rot4(55555555h)=55555555h$$

since the data "55555555h" per se is symmetric.

Hence the equation $$Rot4(M1)(+)Rot4(M2)=55555555h$$

holds.

Accordingly $$\text{Rot4}(M1)(+)M1(+)\text{Rot4}(M2)(+)M2=000000000h$$

i.e.

$$\text{Rot}(M1)(+)M1=\text{Rot4}(M2)(+)M2$$

is true.

Which is to say, the output data generated from the input data M1 will be identical to the output data generated from the input data M2 in the second data substituting unit 403. This signifies that the conversion performed by the second data substituting unit 403 is not a bijection (that is both a surjection and an injection). Therefore, the overall conversion by the data converting unit 40 is not a bijection.

FIG. 2 illustrates the property of the mapping in the second data substituting unit 403 (i.e. the data converting unit 40) that is a non-bijective map. In the figure, two different input values in the domain X are being mapped to the same output value in the range Y.

Such a property of the data converting unit 40 is undesirable in terms of cryptographic security, because a decrease in the number of elements of the range Y as compared with the number of elements of the domain X renders the data shuffling strength of the data converting unit 40 deficient.

Here, it may be conceivable to modify the second data substituting unit 403 in such a way that instead of "Rot4(X)(+)X" it outputs the data Rot2(X) obtained by shift-rotating the input data X by 2 bits toward higher-order positions, so as to make the conversion by the second data substituting unit 403 bijective.

However, such a conversion Rot2(X) lacks a desired degree of security, since it will not produce a sufficient bit avalanche effect. The bit avalanche effect referred to here is the observed property of a cipher on how many bits in the output data change as a result of the change of a single bit in the input data.

SUMMARY OF THE INVENTION

In view of the above problems, the present invention aims to provide a data encryption apparatus and method which employ shift-rotations to perform such a data conversion that is a bijection with a strong data shuffling ability and that produces a sufficient bit avalanche effect.

To fulfill the stated object, the data encryption apparatus of the present invention is a data encryption apparatus for encrypting n-bit plaintext data to obtain n-bit ciphertext data, the data encryption apparatus including: a shift-rotating unit for generating k sets of data by shift-rotating the n-bit plaintext data respectively by S1 bits, S2 bits, . . . , and Sk bits, S1, S2, . . . , and Sk being nonnegative integers less than n, and k being an odd number no less than 3; and a data combining unit for combining together the k sets of data to generate the n-bit ciphertext data.

With this construction, the data encryption apparatus first converts the plaintext data into an odd number of sets of data no fewer than 3 by means of shift-rotations and then combines the sets of data to form the ciphertext data. Accordingly, it is assured that the encryption performed by the data encryption apparatus is bijective and is excellent in data shuffling performance and bit avalanche performance.

That is to say, given that the plaintext data is converted into 3 or more sets of data before the combining process, the bit avalanche effect afforded by the data encryption apparatus of the invention is better than the conventional techniques of converting the plaintext data into only a set of data. Similarly, given that the plaintext data is converted into an odd number of sets of data before the combining process, the data encryption apparatus of the invention bears a bijective property unlike the conventional techniques of converting the plaintext data into two sets of data.

Here, the data encryption apparatus may further include a key combining unit for combining the n-bit plaintext data with key data given beforehand, prior to the shift-rotations by the shift-rotating unit, wherein the shift-rotating unit shift-rotates the n-bit plaintext data combined with the key data.

With this construction, the shift-rotations are performed for the plaintext data which has been combined with the key data. Accordingly, the problem associated with repeating a fixed conversion can be avoided, with it being possible to realize highly secure secret key encryption.

Here, the shift-rotating unit may include k rotating units for shift-rotating the n-bit plaintext data respectively by S1 bits, S2 bits, . . . , and Sk bits.

With this construction, the plaintext data is inputted in the k rotating units in parallel and the shift-rotations of the plaintext data are simultaneously performed, so that the cryptographic speed increases as compared to the case where the shift-rotations are serially performed.

Here, the k rotating units may be made up of signal lines that have wiring patterns for shift-rotating the n-bit plaintext data respectively by S1 bits, S2 bits, . . . , and Sk bits. Also, the key combining unit and the data combining unit may be made up of an arithmetic adder and an exclusive-OR gate, respectively.

With this construction, the data encryption apparatus which performs data shuffling at high speed can be implemented by simple circuitry.

Here, the data combining unit may combine key data given beforehand with n-bit data obtained by combining together the k sets of data, to generate the n-bit ciphertext data.

With this construction, the outcome of shift-rotating the plaintext data and combining together the shift-rotation results is further combined with the key data. Accordingly, the problem associated with repeating a fixed conversion can be avoided, with it being possible to realize highly secure secret key encryption.

Here, the shift-rotating unit may include: k rotating units for shift-rotating the n-bit plaintext data respectively by specified rotation amounts; a key data acquiring unit for acquiring key data; and a rotation amount determining unit for determining values of S1, S2, . . . , and Sk based on the acquired key data and specifying, for the k rotating units, S1 bits, S2 bits, . . . , and Sk bits as the respective rotation amounts, wherein the k rotating units shift-rotate the n-bit plaintext data respectively by S1 bits, S2 bits, . . . , and Sk bits as specified by the rotation amount determining unit.

With this construction, the rotation amounts of the k rotating units are dynamically determined using the key data, which benefits cryptographic secrecy.

Here, the shift-rotating unit may include: m rotating units for shift-rotating the n-bit plaintext data respectively by S1 bits, S2 bits, . . . , and Sm bits, S1, S2, . . . , and Sm being nonnegative integers less than n, and m being an integer no less than 3; a key data acquiring unit for acquiring key data; and a selecting unit for selecting k rotating units from the m rotating units based on the acquired key data so that the k sets of data are generated as a result of shift-rotations of the n-bit plaintext data by the selected k rotating units.

With this construction, the number of sets of data to be generated from the plaintext data and the rotation amounts to be applied to the plaintext data are dynamically determined using the key data, which benefits cryptographic secrecy.

The above object can also be fulfilled by a data encryption method that realizes the features of the above data encryption apparatus or a program that executes the data encryption method.

Thus, the data encryption apparatus of the present invention exhibits stronger data shuffling performance without decreasing the cryptographic speed of the conventional techniques that use shift-rotations. In view of growing demands for developments in the multimedia technology, the data encryption apparatus of the invention has wide applicability and potential particularly in areas such as real-time secret communications for image or audio information.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings.

DESCRIPTION OF THE PREFERRED EMBODIMENT(S)

The following is a detailed description of an embodiment of the present invention with reference to the figures.

In general, ciphertext data generated in a data encryption apparatus by means of encryption with key data is converted into decrypted text data in a data decryption apparatus by means of inverse conversion of the encryption using the same key data.

This embodiment concerns an application of the invention to an encrypted communication system where the transmitter provided with a data encryption apparatus encrypts plaintext data and sends ciphertext data to the receiver, and the receiver provided with a data decryption apparatus decrypts the ciphertext data to obtain decrypted text data which can be put to use.

Configuration of the Encrypted Communication System

Figure 3:
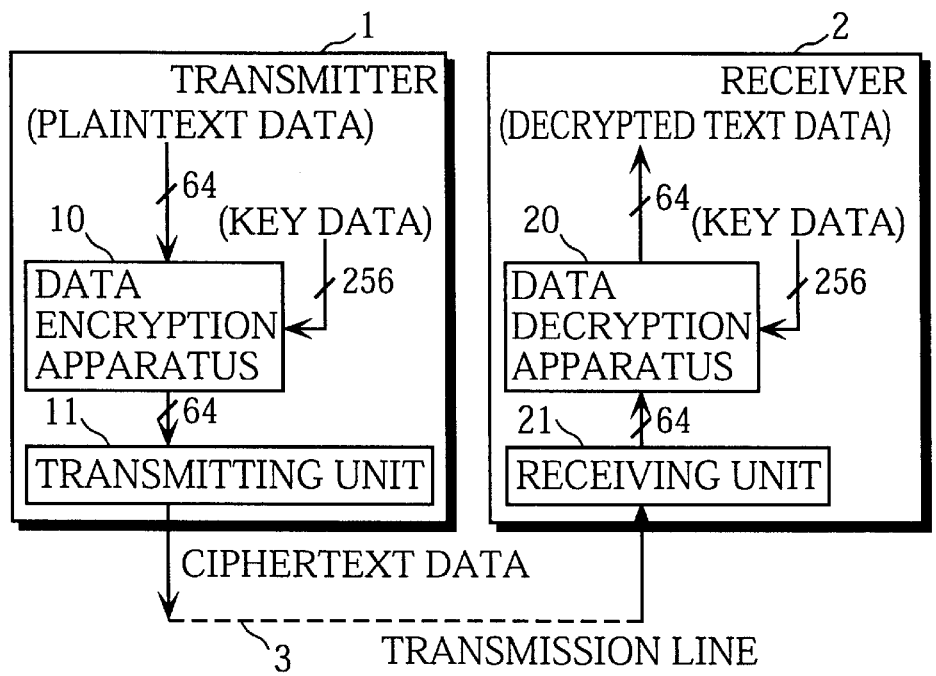
FIG. 3 is a block diagram showing the configuration of an encrypted communication system in an embodiment of the present invention.

FIG. 3 is a block diagram showing the configuration of the encrypted communication system in the embodiment of the present invention. This encrypted communication system is mainly composed of a transmitter 1, a receiver 2, and a transmission line 3. The transmitter 1 and the receiver 2 are, for example, a server and a terminal it serves that respectively transmit and receive digitized image information in a video server system, whereas the transmission line 3 is a communication network represented by the Internet or a transport stream in digital broadcasting.

The transmitter 1 is provided with a data encryption apparatus 10 and a transmitting unit 11. 64-bit plaintext data and 256-bit key data are inputted in the data encryption apparatus 10. Here, the plaintext data is one of the blocks generated by dividing information such as digitally-coded audio or image information in units of 64 bits, whereas the key data is a secret key agreed between the transmitter 1 and the receiver 2 in advance. The data encryption apparatus 10 processes the inputted plaintext data and key data and generates 64-bit ciphertext data. The transmitting unit 11 parallel-serial converts, modulates, and amplifies the generated ciphertext data and transmits it to the receiver 2 via the transmission line 3.

The receiver 2 is provided with a data decryption apparatus and a receiving unit 21. The 64-bit ciphertext data is received and serial-parallel converted by the receiving unit 21 and then inputted in the data decryption apparatus 20 along with the 256-bit key data. The data decryption apparatus 20 processes the inputted ciphertext data and key data to obtain 64-bit decrypted text data, which is then decoded by a decoder (not illustrated) or the like and outputted via a display or a speaker.

Construction of the Data Encryption Apparatus 10

Figure 4:
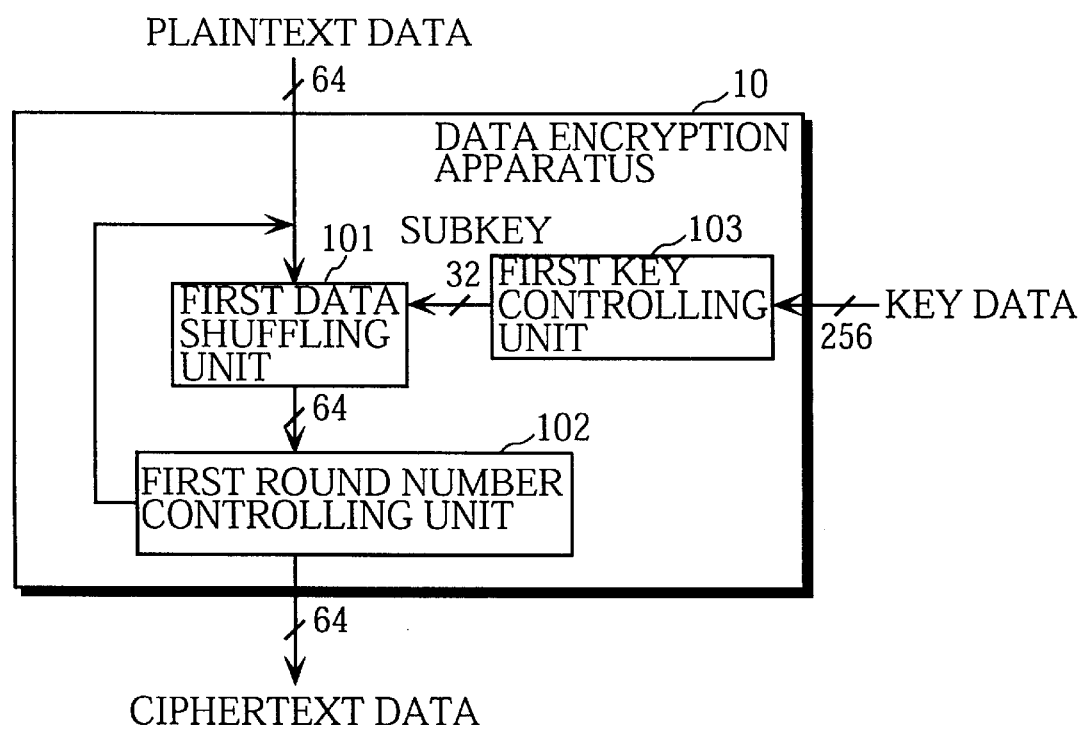
FIG. 4 is a block diagram showing the construction of a data encryption apparatus shown in FIG. 3.

FIG. 4 is a block diagram showing the construction of the data encryption apparatus 10 shown in FIG. 3. This data encryption apparatus 10 includes a first data shuffling unit 101, a first round number controlling unit 102, and a first key controlling unit 103.

The first data shuffling unit 101 shuffles the incoming 64-bit plaintext data with a 32-bit subkey given from the first key controlling unit 103, and outputs resulting 64-bit data.

The first round number controlling unit 102 controls the number of rounds of shuffling repeated by the first data shuffling unit 101. More specifically, if the number of rounds of shuffling performed by the first data shuffling unit 101 is below a predetermined number, the first round number controlling unit 102 returns the 64-bit data outputted from the first data shuffling unit 101 back into the first data shuffling unit 101. If the number of rounds has reached the predetermined number, on the other hand, the first round number controlling unit 102 passes the 64-bit data to the transmitting unit 11 as the 64-bit ciphertext data. The predetermined number is eight in this embodiment.

The first key controlling unit 103 divides the incoming 256-bit key data from the highest-order bit thereof into eight 32-bit subkeys K0~K7, and outputs subkeys K0~K7 one by one to the first data shuffling unit 101 for the eight rounds. To be more specific, when the 64-bit plaintext data is initially inputted in the first data shuffling unit 101, the first key controlling unit 103 supplies subkey K0 to the first data shuffling unit 101. After this, whenever data outputted from the first data shuffling unit 101 is returned back into the first data shuffling unit 101, the first key controlling unit 101 supplies subkeys K1~K7 one at a time to the first data shuffling unit 101.

Construction of the Data Decryption Apparatus 20

Figure 5:
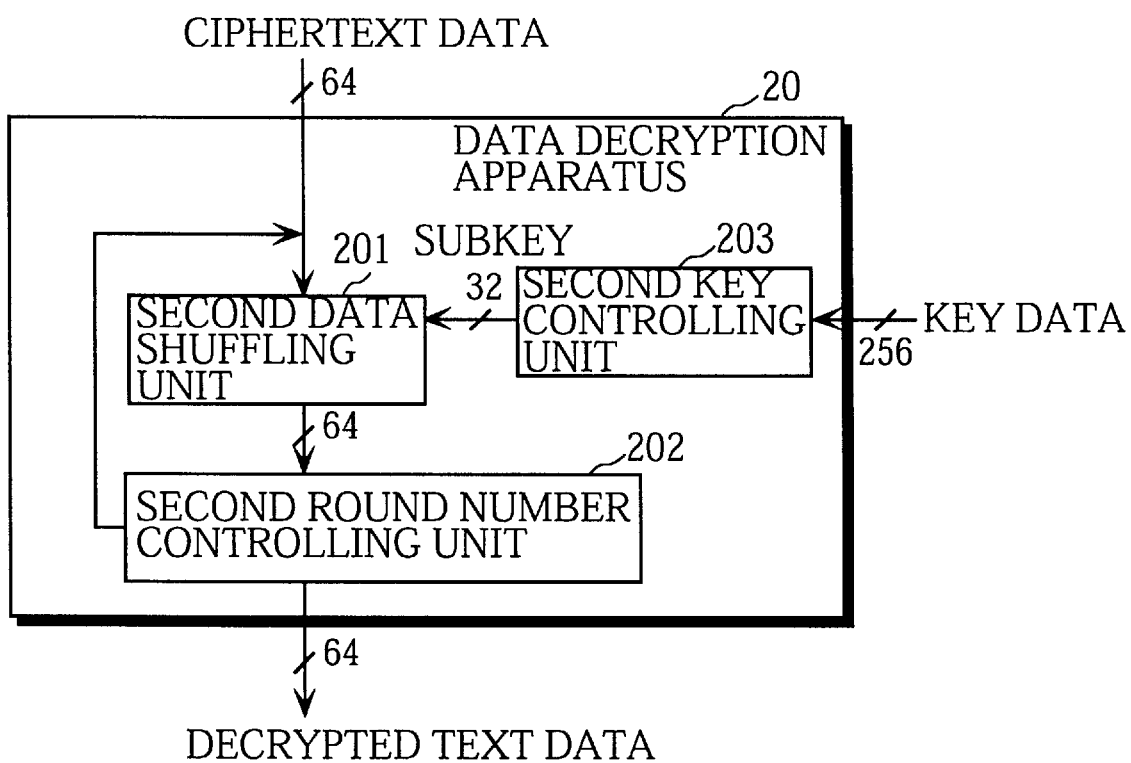
FIG. 5 is a block diagram showing the construction of a data decryption apparatus shown in FIG. 3.

FIG. 5 is a block diagram showing the construction of the data decryption apparatus 20 shown in FIG. 3. This data decryption apparatus 20 includes a second data shuffling unit 201, a second round number controlling unit 202, and a second key an controlling unit 203.

The second data shuffling unit 201 shuffles the 64-bit ciphertext data passed through the receiving unit 21 using a 32-bit subkey given from the second key controlling unit 203, and outputs resulting 64-bit data.

The second round number controlling unit 202 controls the number of rounds of shuffling repeated by the second data shuffling unit 201. More specifically, if the number of rounds of shuffling performed by the second data shuffling unit 201 is below a predetermined number, the second round number controlling unit 102 returns the 64-bit data outputted from the second data shuffling unit 201 back into the second data shuffling unit 201. If, on the other hand, the number of rounds has reached the predetermined number, the second round number controlling unit 201 outputs the 64-bit data as the decrypted text data. The specified number is eight in this embodiment.

The second key controlling unit 203 divides the incoming 256-bit key data from the highest-order bit thereof into eight 32-bit subkeys L7~L0, and outputs subkeys L0~L7 one by one to the second data shuffling unit 201 for the eight rounds. To be more specific, when the ciphertext data is initially inputted in the second data shuffling unit 201, the second key controlling unit 203 supplies subkey L0 to the second data shuffling unit 201. Following this, whenever data outputted from the second data shuffling unit 201 is returned back into the second data shuffling unit 201, the second key controlling unit 203 supplies subkeys L1~L7 one at a time to the second data shuffling unit 201.

Construction of the First Data Shuffling Unit 101

Figure 6:
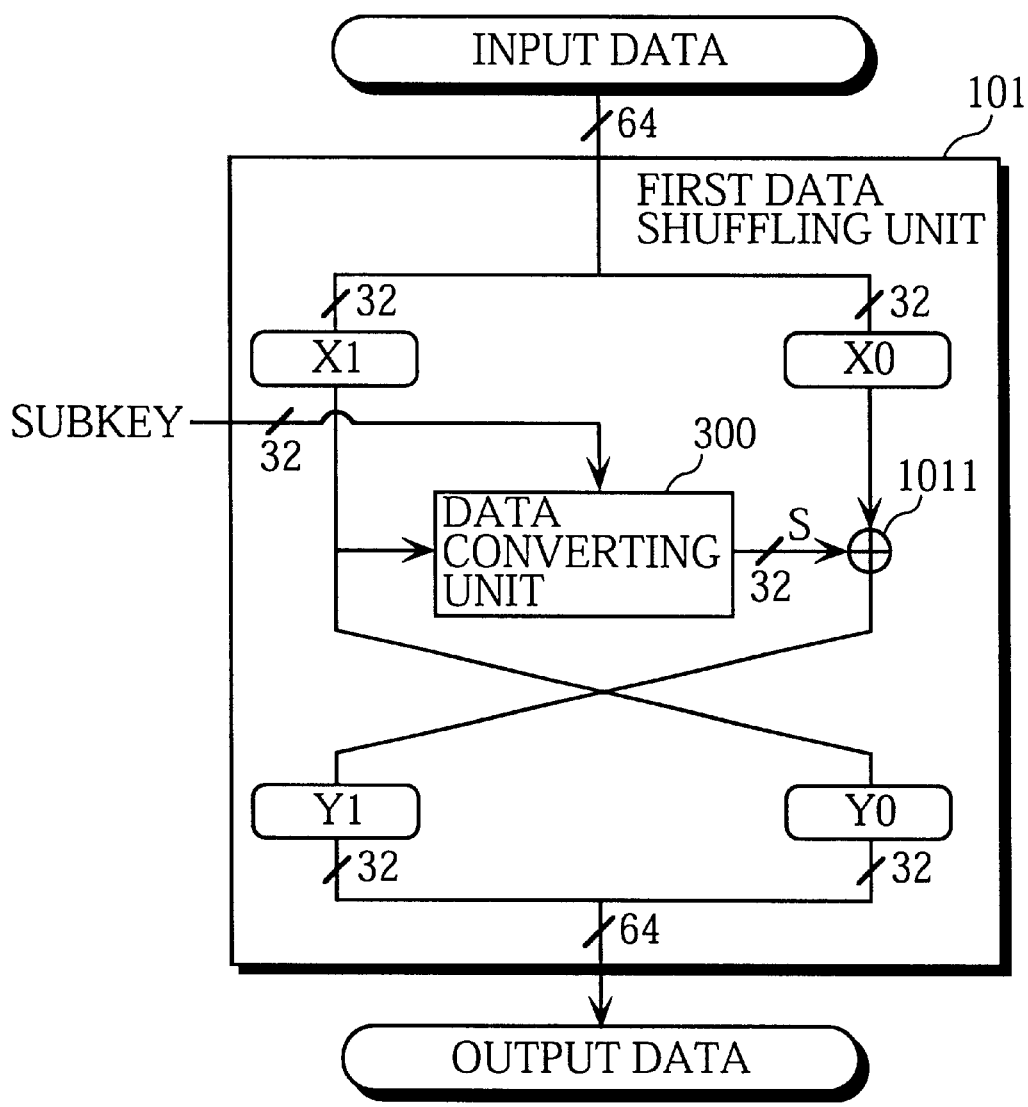
FIG. 6 is a block diagram showing the construction of a first data shuffling unit in the data encryption apparatus.

FIG. 6 is a block diagram showing the construction of the first data shuffling unit 101 shown in FIG. 4. This first data shuffling unit 101 includes an exclusive-OR unit 1011 and a data converting unit 300. Note that processes such as a split (dividing a set of data into a plurality of parts), a transposition (exchanging positions of the plurality of parts), and a concatenation (linking the plurality of parts as digits to form a new set of data) are indicated by the illustrated wiring pattern.

64-bit input data is split into higher-order 32-bit block X1 and lower-order 32-bit block X0, whereas 64-bit output data is made up of a combination of two 32-bit blocks Y1 and Y0 respectively as higher-order bits and lower-order bits.

Block X1 becomes block Y0, and is also inputted in the data converting unit 300 where it is converted to 32-bit data S based on a 32-bit subkey given from the first key controlling unit 103. The data converting unit 300 outputs data S to the exclusive-OR unit 1011 which in turn takes an exclusive-OR for corresponding bits in data S and block X0 and outputs the outcome as block Y1.

Such obtained two blocks Y1 and Y0 are concatenated as the 64-bit output data and outputted from the first data shuffling unit 101 in sync with a clock (not illustrated).

Construction of the Second Data Shuffling Unit 201

Figure 7:
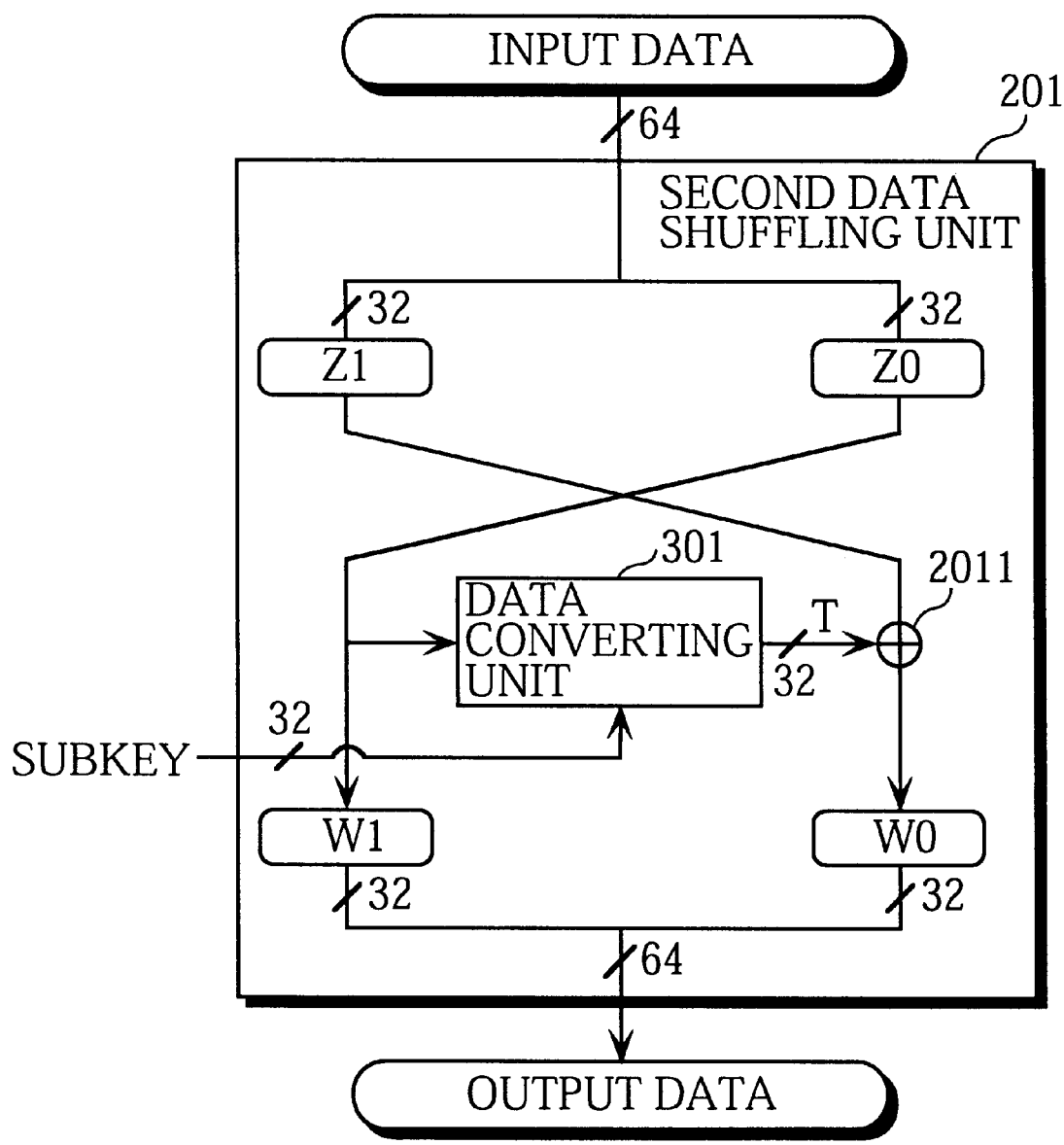
FIG. 7 is a block diagram showing the construction of a second data shuffling unit in the data decryption apparatus.

FIG. 7 is a block diagram showing the construction of the second data shuffling unit 201 shown in FIG. 5. This second data shuffling unit 201 includes a data converting unit 301 and an exclusive-OR unit 2011. The data converting unit 301 and the exclusive-OR unit 2011 have the functions respectively identical to the data converting unit 300 and exclusive-OR unit 1011 in the first data shuffling unit 101 in FIG. 6. Likewise, processes such as a split, a transposition, and a concatenation conducted in the second data shuffling unit 201 are indicated by the wiring pattern shown in the figure.

64-bit input data is split into higher-order 32-bit block Z1 and lower-order 32-bit block Z0, whereas 64-bit output data is made up of a combination of two 32-bit blocks W1 and W0 respectively as higher-order bits and lower-order bits.

Block Z0 becomes block W1, and is simultaneously inputted in the data converting unit 301 where it is converted to 32-bit data T based on a 32-bit subkey given from the second key controlling unit 203. The data converting unit 301 outputs data T to the exclusive-OR unit 2011 which in turn takes an exclusive-OR for corresponding bits in data T and block Z1 and outputs the resultant as block W0.

Construction of the Data Converting Units 300 and 301

Figure 8:
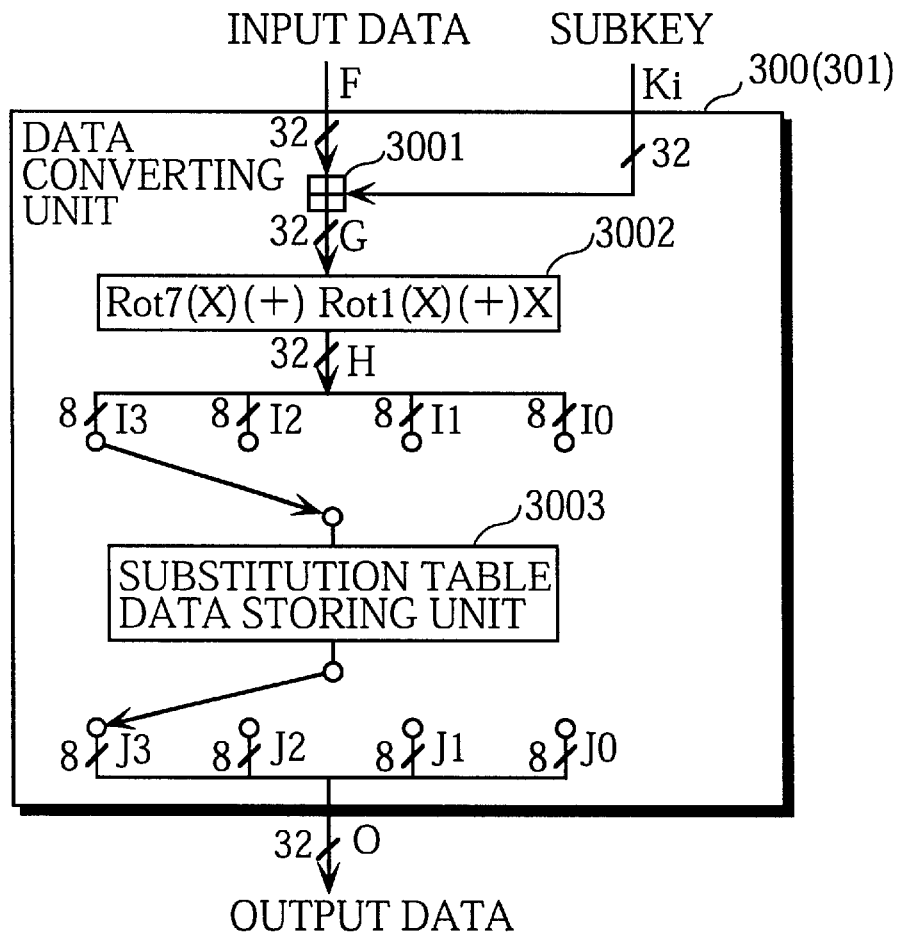
FIG. 8 is a block diagram showing the construction of a data converting unit in the first data shuffling unit (and the second data shuffling unit)

FIG. 8 is a block diagram showing the construction of the data converting unit 300 shown in FIG. 6 (and the data converting unit 301 shown in FIG. 7).

The data converting unit 300 receives 32-bit input data F and 32-bit subkey Ki and generates 32-bit output data O. A key adding unit 3001, a data substituting unit 3002, and a substitution table data storing unit 3003 are included in the data converting unit 300.

The key adding unit 3001 is made up of, as an example, an adder that has two 32-bit inputs and one 32-bit output. The key adding unit 3001 performs an arithmetic addition modulo $2^{32}$ on input data F and subkey Ki and outputs the solution as 32-bit data G. This operation can be written as $$G=(F+K_i) \bmod 2^{32}$$

The data substituting unit 3002 is made up of signal lines which have the fixed wiring pattern for shift-rotations, an exclusive-OR gate, and so on. On receiving data G, the data substituting unit 3002 takes an exclusive-OR for corresponding bits in data Rot7(G) obtained by shift-rotating data G by 7 bits toward higher-order positions, data Rot1(G) obtained by shift-rotating data G by 1 bit toward higher-order positions, and data G itself, and outputs the operation result as 32-bit data H. This operation is expressed as $$H=Rot7(G)(+)Rot1(G)(+)G$$

After this, data H is divided from the highest-order bit thereof into four 8-bit blocks I3, I2, I1, and I0, which are inputted one by one in the substitution table data storing unit 3003.

The substitution table data storing unit 3003 is made up of a ROM or the like which holds substitution table data Tab[0~255] containing different 8-bit values in 256 storage locations. The substitution table data storing unit 3003 functions as a converter that outputs an 8-bit value stored in a location specified by 8-bit input data.

To be more specific, the substitution table data storing unit 3003 stores such 256×8-bit substitution table data that is described in Aoki et al. "S-Box Design Considering the Security against Known Attacks on Block Ciphers" in *IEICE Technical Report*, ISEC98-13. In response to sequential inputs of blocks I3, I2, I1, and I0, the substitution table data storing unit 3003 outputs 8-bit values J3=Tab[I3], J2=Tab[I2], J1=Tab[I1], and J0=Tab[I0] one by one that are respectively stored in locations specified by blocks I3, I2, I1, and I0.

Four 8-bit values J3, J2, J1, and J0 are linked in this order with J3 being the highest-order bits, and the resulting 32-bit data is outputted from the data converting unit 300 as output data O.

It should be noted that switching of the input/output in the substitution table data storing unit 3003 is done, for instance, by a multiplexer circuit and a demultiplexer circuit which are being driven in sync with each other so that J0~J3 will be outputted respectively in response to I0~I3.

Relationship between the First Data Shuffling Unit 101 and the Second Data Shuffling Unit 201

The first data shuffling unit 101 in FIG. 6 and the second data shuffling unit 201 in FIG. 7 both receive 64-bit data and a 32-bit subkey and output 64-bit data. The following explains the relationship between the first data shuffling unit 101 and the second data shuffling unit 201, to clarify the reason that plaintext data encrypted by the first data shuffling unit 101 is recovered by the second data shuffling unit 201.

As noted once, X1, X0, Y1, Y0, and S in the first data shuffling unit 101 in FIG. 6 have the relationships $$S = F(Ki, X1) \quad \text{(equation 1)}$$

$$Y1 = S(+)X0 \quad \text{(equation 2)}$$

$$Y0 = X1 \quad \text{(equation 3)}$$

where "Ki" denotes a 32-bit subkey and "F(Ki,α)" denotes an output of the data converting unit 300 whose input is α.

Meanwhile, Z1, Z0, W1, W0, and T in the second data shuffling unit 201 in FIG. 7 have the relationships $$T = F(Ki, Z0) \quad \text{(equation 4)}$$

$$W1 = Z0 \quad \text{(equation 5)}$$

$$W0 = T(+)Z1 \quad \text{(equation 6)}$$

when the same 32-bit subkey Ki is used.

Since output data of the first data shuffling unit 101 is inputted in the second data shuffling unit 201, $$Y1 = Z1 \quad \text{(equation 7)}$$

$$Y0 = Z0 \quad \text{(equation 8)}$$

From equations 3 and 8, $$Y0 = Z0 = X1 \quad \text{(equation 9)}$$

According to equation 9, equation 4 can be transformed to $$T = F(Ki, X1) \quad \text{(equation 10)}$$

From equations 1 and 10, $$S = T \quad \text{(equation 11)}$$

From equations 6 and 11, $$W0 = S(+)Z1 \quad \text{(equation 12)}$$

From equations 7 and 12, $$W0 = S(+)Y1 \quad \text{(equation 13)}$$

Further, from equations 2 and 13, $$W0 = S(+)S(+)\{s(+)X0\} \quad \text{(equation 14)}$$

Here, an exclusive-OR has the property that is $$\beta(+)\{\beta(+)\gamma\} = \gamma \quad \text{(equation 15)}$$

According to equations 14 and 15, $$W0 = X0 \quad \text{(equation 16)}$$

is true.

Meanwhile, from equations 3, 5, and 8, $$W1 = X1 \quad \text{(equation 17)}$$

is true.

As can be seen from equations 16 and 17, it is clear that, when 64-bit data Y which has been produced by shuffling 64-bit data X with 32-bit subkey Ki in the first data shuffling unit 101 is shuffled using the same 32-bit subkey Ki in the second data shuffling unit 201, the 64-bit data X can be recovered.

Operation of the First Key Controlling Unit 103

The first key controlling unit 103 in FIG. 4 operates as follows.

For encryption of 64-bit plaintext data in the data encryption apparatus 10, the first data shuffling unit 101 repeats shuffling eight times. The first key controlling unit. 103 outputs subkey K0 in the first round, subkey K1 in the second round, . . . , and lastly subkey K7 in the eighth round, to the first data shuffling unit 101.

Operation of the Second Key Controlling Unit 203

On the other hand, the second key controlling unit 203 in FIG. 5 operates as follows.

For decryption of 64-bit ciphertext data in the data decryption apparatus 20, the second data shuffling unit 201 repeats shuffling eight times. The second key controlling unit 203 outputs subkey L0 in the first round, subkey L1 in the second round, . . . , and lastly subkey L7 in the eighth round, to the second data shuffling unit 201.

Relationship between the Data Encryption Apparatus 10 and the Data Decryption Apparatus 20

The data encryption apparatus 10 in FIG. 4 and the data decryption apparatus 20 in FIG. 5 both receive 64-bit data and 256-bit key data and output 64-bit data. The following explains the relationship between the data encryption apparatus 10 and the data decryption apparatus 20, to clarify the reason that plaintext data encrypted by the data encryption apparatus 10 is recovered by the data decryption apparatus 20.

Assume 64-bit plaintext data A is to be encrypted in the data encryption apparatus 10 using 256-bit key data K.

The first key controlling unit 103 divides the key data K from the highest-order bit thereof into 32-bit subkeys K0~K7 which are then sequentially inputted in the first data shuffling unit 101.

In the first data shuffling unit 101, the plaintext data A is shuffled using subkey K0 and as a result becomes data A1. Then, data A1 is shuffled using subkey K1 and becomes data A2. The same is repeated for data A2 to data A6 to respectively produce data A3 to data A7. Finally, data A7 is shuffled using subkey K7 and becomes data A8. Data A8 is then outputted from the data encryption apparatus 10 as ciphertext data, transmitted to the receiver 2 via the transmitting unit 11 and the transmission line 3, and inputted in the data decryption apparatus 20 through the receiving unit 21.

The same 256-bit key data K as the data encryption apparatus 10 is used in the data decryption apparatus 20. The second key controlling unit 203 divides the key data K from the highest-order bit thereof into 32-bit subkeys L7~L0, and sequentially supplies subkeys L0~L7 to the second data shuffling unit 201 in this order. Here, K0=L7, K1=L6, K2=L5, K3=L4, K4=L3, K5=L2, K6=L1, and K7=L0, since the key data K used in the data decryption apparatus 20 is identical to the key data K used in the data encryption apparatus 10.

In the second data shuffling unit 201, the ciphertext data A8 is shuffled using subkey L0 and as a result becomes data B1. Here, B1=A7, because K7=L0 and the shuffling by the second data shuffling unit 201 is the inverse conversion of the shuffling by the first data shuffling unit 101. After this, data B1 is shuffled using subkey L1 and as a result becomes data B2. Here, B2=A6, because K6=L1 and the shuffling by the second data shuffling unit 201 is the inverse conversion of the shuffling by the first data shuffling unit 101.

The same is repeated for data B2 to data B6 to respectively produce data B3 to data B7, where B3=A5, B4=A4, B5=A3, B6=A2, and B7=A1 for the above stated reason. Finally, data B7 is shuffled using subkey L7, the outcome of which is decrypted text data B8. Here, B8=A, because B7=A1, K0=L7, and the shuffling by the second data shuffling unit 201 is the inverse conversion of the shuffling by the first data shuffling unit 101.

It is thus proved that, when 64-bit ciphertext data B produced by encrypting 64-bit plaintext data A with 256-bit key data K in the data encryption apparatus 10 is decrypted using the same 256-bit key data K in the data decryption apparatus 20, the 64-bit plaintext data A can be recovered.

Operation of the Encrypted Communication System

The overall operation of the encrypted communication system of the present embodiment is explained below with reference to FIGS. 3~8.

The transmitter 1 digitizes and encodes incoming image or audio information of a fixed time length and so creates 64-bit plaintext data. The plaintext data is then inputted in the data encryption apparatus 10 along with 256-bit key data retained in the transmitter 1 in advance.

The 256-bit key data is inputted in the first key controlling unit 103 and divided from the highest-order bit thereof into 32-bit subkeys K0~K7.

The 64-bit plaintext data is inputted in the first data shuffling unit 101 together with subkey data K0 and shuffled using subkey K0. This shuffling is repeated for eight rounds in total under control of the first round number controlling unit 102, during which subkeys K0~K7 are sequentially used. Consequently, 64-bit ciphertext data is obtained and outputted from the data encryption apparatus 10.

This 64-bit ciphertext data is then transmitted from the transmitter 1 to the receiver 2 via the transmitting unit 11 and the transmission line 3.

The ciphertext data is received by the receiving unit 21 in the receiver 2 and inputted in the data decryption apparatus 20 along with 256-bit key data.

The 256-bit key data is inputted in the second key controlling unit 203 and divided from the highest-order bit thereof into 32-bit subkeys L7~L0.

The ciphertext data is inputted in the second data shuffling unit 201 together with subkey L0 and shuffled using subkey L0. This shuffling is repeated for the total eight rounds under control of the second round number controlling unit 202, during which subkeys L0~L7 are sequentially used. As a result, 64-bit decrypted text data is obtained and outputted from the data decryption apparatus 20.

The decrypted text data is converted to image or audio signals in the receiver 2 and displayed on a display or outputted through a speaker.

Security of the Data Encryption Apparatus 10

The following is an explanation on the security of the data encryption apparatus 10.

First, the reason that the conversion by the data converting unit 300 in the transmitter 1 (and the data converting unit 301 in the receiver 2) is a bijection is given below.

The operation performed by the key adding unit 3001 is an addition of input data and a subkey generated from the key data. The value of the subkey is fixed regardless of the input data. Therefore, the conversion by the key adding unit 3001 is bijective.

For the data substituting unit 3002, on the other hand, it has been confirmed according to computer-based experiments that an output value will not be 0 for an input value between 1 and $(2^{32}-1)$ inclusive. From this experimental result and the linearity of the operation of the data substituting unit 3002, it is guaranteed that the conversion by the data substituting unit 3002 is bijective.

The rationale for the bijective property of the data substituting unit 3002 can also be shown theoretically as follows.

Let $A31~A0$ be 32 bits that compose input data A of the data substituting unit 3002 from the highest-order bit thereof, i.e. $A=(A31, A30, \ldots, A0)$.

Then

Rot1(A)=(A30, A29, . . . , A1, A0, A31)

Rot7(A)=(A24, A23, , A27, A26, A25)

Therefore,

Rot7(A) (+)Rot1(A) (+)A

=(A31(+)A30(+)A24, A30(+)A29(+)A23, . . . ,

A1(+)A0(+)A26, A0(+)A31(+)A25)

Let $B=(B31, B30, \ldots, B0)$ be 32-bit output data of the data substituting unit 3002. Then the conversion by the data substituting unit 3002 can be expressed as $$\begin{pmatrix} B31 \\ B30 \\ \vdots \\ B0 \end{pmatrix} = X \begin{pmatrix} A31 \\ A30 \\ \vdots \\ A0 \end{pmatrix} \quad \text{(equation 18)}$$

where $$X = \begin{pmatrix} X0 & X1 & X2 & \cdots & X31 \\ X31 & X0 & X1 & \cdots & X30 \\ \vdots & \vdots & \vdots & \ddots & \vdots \\ X0 & X2 & X3 & \cdots & X0 \end{pmatrix} \quad \text{(equation 19)}$$

and $X0=X1=X6=1$ $Xi=0$ (where $i\neq 0, 1, 6$) (equation 20)

According to problem 4 and its solution in Masahiko Saito *An Introduction to Linear Algebra*, p. 90, Tokyo University Press (1966), $$\det X = \prod_{\alpha^{32}=1} (X0 + \alpha X1 + \alpha^2 X2 + \cdots + \alpha^{31} X31) \quad \text{(equation 21)}$$

where "detX" denotes the determinant of the matrix X and the right side of the equation represents the product for every a that is the 32nd root of 1.

According to equations 19 and 20, equation 21 can be transformed into $$\det X = \prod_{\alpha^{32}=1} (1 + \alpha + \alpha^6) \quad \text{(equation 22)}$$

It has been proven in example problem 39.1 in Hiroshi Nagao *Algebra*, p.165, Asakura Books (1983) that $\alpha^{32}=1$ when and only when $\alpha=1$. Hence equation 22 can be written as detX=1+1+1=1 mod 2 (equation 23)

Therefore, the matrix X is an invertible matrix and the output of the data substituting unit 3002 is zero when and only when the input is zero. This fact and the linearity of the data substituting unit 3002 ensures that the conversion by the data substituting unit 3002 is a bijection.

The above rationale for the bijective property of the conversion RotN1(+)RotN2(+)RotN3 also applies to (N1, N2, N3)≈(7, 1, 0). Also, the same goes for cases where the number of shift-rotations to be used is an odd number other than 3. In other words, the conversion by the data substituting unit 3002 is definitely bijective as long as the conversion involves an odd number of shift-rotations (including a shift-rotation by 0 bit).

The substitution table data storing unit 3003 converts 8-bit input data based on the prestored substitution table data that contains 256 different 8-bit table values. Accordingly, the conversion by the substitution table data storing unit 3003 is bijective, too.

Thus, the conversions performed by the construction elements of the data converting unit 300 (301) are all bijections, so that the overall conversion of the data converting unit 300 (301) per se is a bijection.

Figure 1:
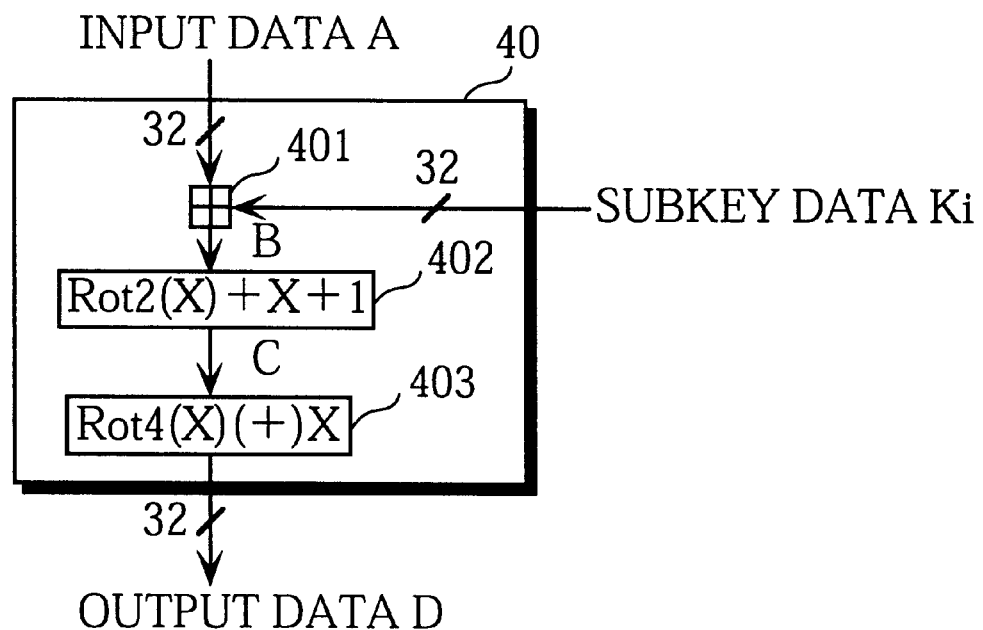
FIG. 1 is a block diagram showing the construction of a data converting unit in a conventional data encryption apparatus.
Figure 2:
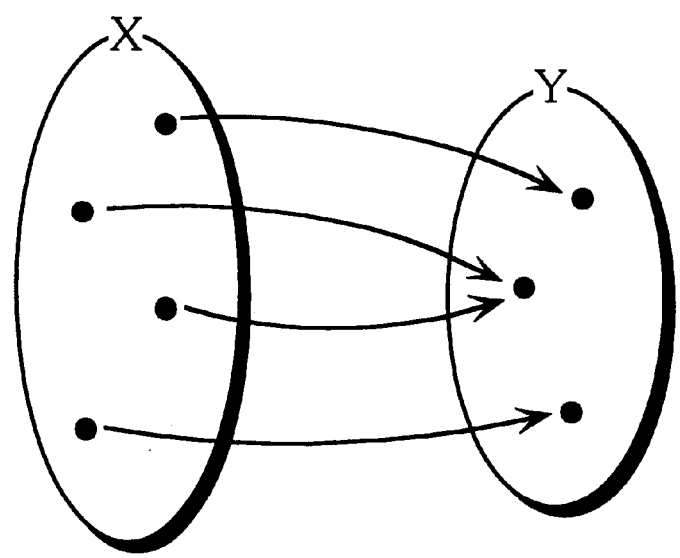
FIG. 2 illustrates the property of the mapping in the conventional data converting unit.
Figure 9:
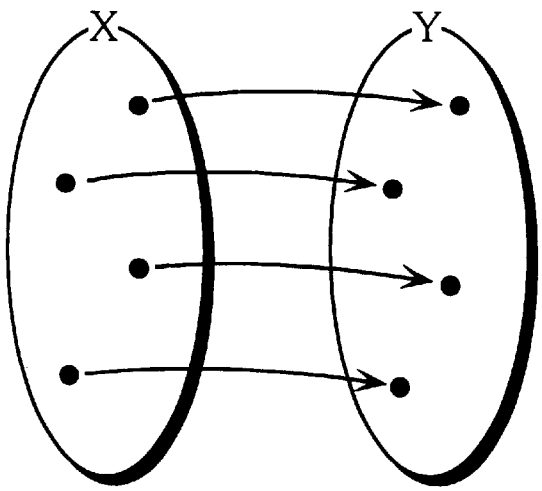
FIG. 9 illustrates the property of the mapping in the data converting unit.

FIG. 9 shows the mapping of the data substituting unit 3002 (i.e. the data converting unit 300 (301)) of the embodiment which is a bijective map. As can be seen from the figure, two different values in the domain X are infallibly being mapped to two different values in the range Y, unlike the conventional mapping shown in FIG. 2. With this mapping of the present embodiment, the problems associated with the decrease in the number of elements of the range Y as compared with the number of elements of the domain X can be avoided.

Thus, unlike the conventional techniques, the data substituting unit 3002 (the data converting unit 300 (301)) in this embodiment carries out a bijective conversion, thereby offering better data shuffling performance and benefitting cryptographic security.

The bit avalanche performance of the data converting unit 300 (301) in this embodiment is analyzed next.

The data substituting unit 3002 in the data converting unit 300 (301) performs an exclusive-OR operation for corresponding bits in input data X and two shift-rotation results of the input data X that are data Rot7(X) and data Rot1(X). Accordingly, the change in a single bit in the input data X affects not only the bit itself but another two bits. Besides, output data of the data substituting unit 3002 is further processed nonlinearly in the substitution table data storing unit 3003, as a result of which many more bits will end up being affected.

Thus, the data converting unit 300 (301), i.e. the data encryption apparatus 10, in this embodiment produces a high bit avalanche effect unlike the conventional techniques, thereby delivering better data shuffling performance and cryptographic security.

In short, the data converting unit 300 (301) in the embodiment differs with the conventional techniques in that it is provided with the data substituting unit 3002 which performs an odd number (no less than 3) of different shift-rotations (including a shift-rotation by 0 bit) on input data and takes an exclusive-OR for corresponding bits in the input data and the shift-rotation results. Such encryption is not only fast due to the use of shift-rotations but also bijective and excellent in bit avalanche performance, so that a considerably high degree of cryptographic security can be attained.

First Variant

Variants of the data converting unit 300 (301) in the above embodiment are presented below. Each of the variants given below can substitute for the data converting unit 300 (301) without impairing the effects achieved by the data converting unit 300 (301).

Figure 10:
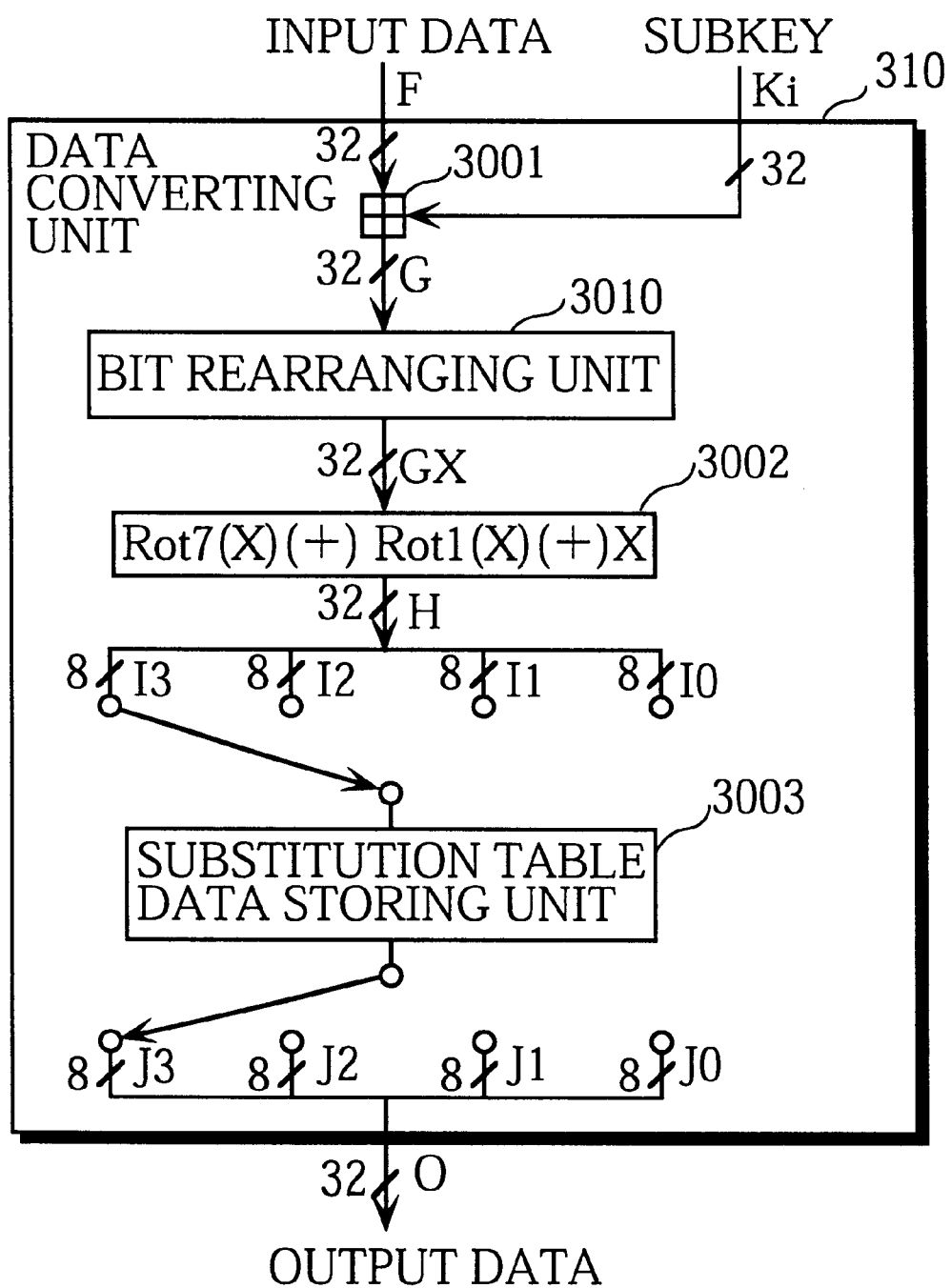
FIG. 10 is a block diagram showing the construction of a data converting unit according to the first variant.

FIG. 10 is a block diagram showing the construction of a data converting unit 310 in the first variant. In this figure and the figures that follow, construction elements which are the same as those in the above embodiment shown in FIG. 8 have been given the same reference numerals.

The data converting unit 310 differs with the data converting unit 300 (301) in that a bit rearranging unit 3010 has been inserted between the key adding unit 3001 and the data substituting unit 3002.

The bit rearranging unit 3010 arbitrarily rearranges the bits of 32-bit data G outputted from the key adding unit 3001. For example, the bit rearranging unit 3010 shifts the first bit of data G to the 15th bit, the second bit to the 27th bit, the third bit to the seventh bit, and so on, and outputs the obtained 32-bit data GX to the data substituting unit 3002.

Since the conversion performed by the bit rearranging unit 3010 is a bijection, the overall conversion of the data converting unit 310 per se is bijective. Hence the data converting unit 310 can ensure at least the level of data shuffling performance equal to the data converting unit 300 (301) of the above embodiment.

Second Variant

Figure 11:
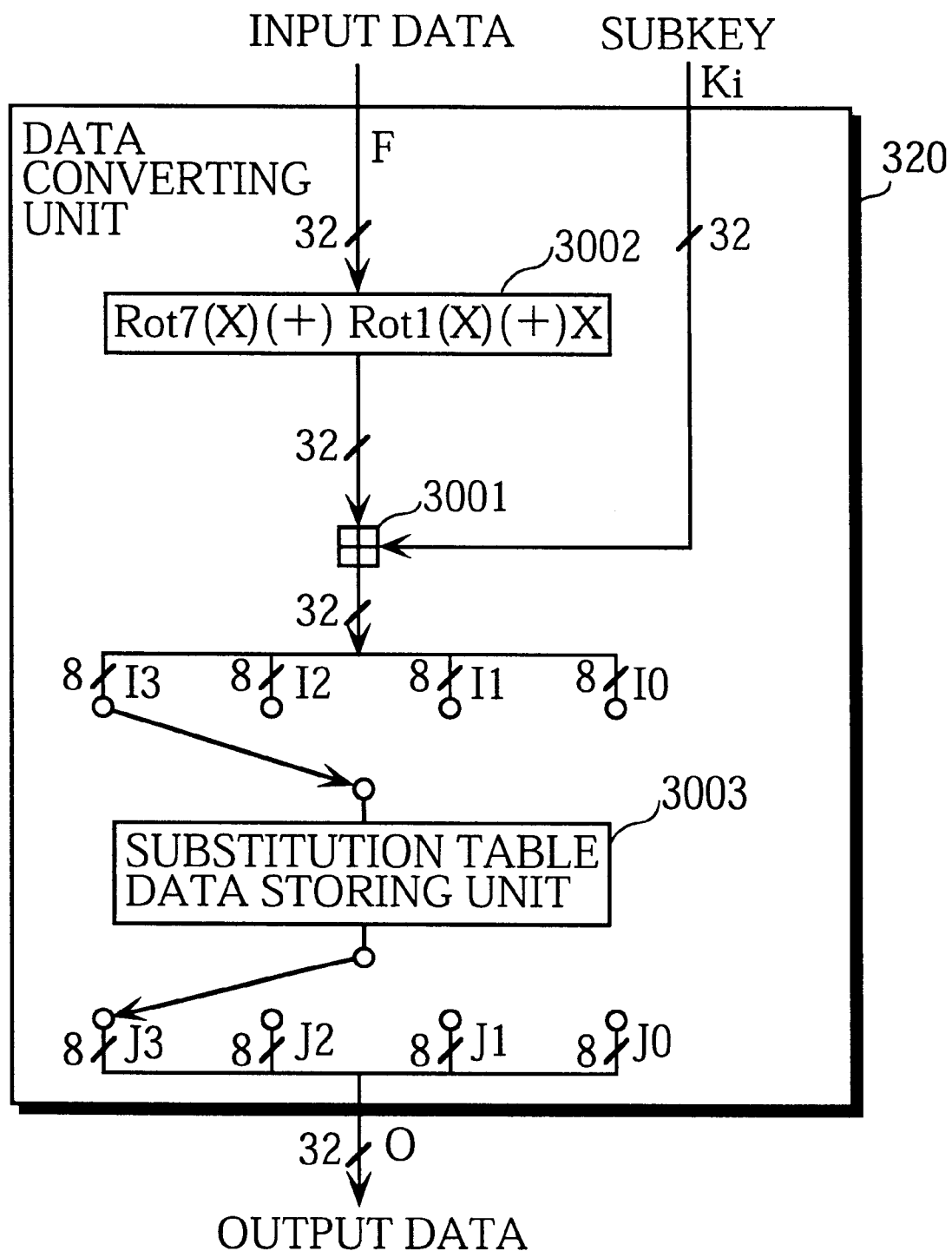
FIG. 11 is a block diagram showing the construction of a data converting unit according to the second variant.

FIG. 11 is a block diagram showing the construction of a data converting unit 320 in the second variant. This data converting unit 320 differs with the data converting unit 300 (301) in that the key adding unit 3001 and the data substituting unit 3002 have been interchanged (i.e. the connection between the key adding unit 3001 and the data substituting unit 3002 has been reversed).

Needless to say, the data converting unit 320 is capable of delivering the same level of data shuffling performance as the data converting unit 300 (301) of the above embodiment.

Third Variant

Figure 12:
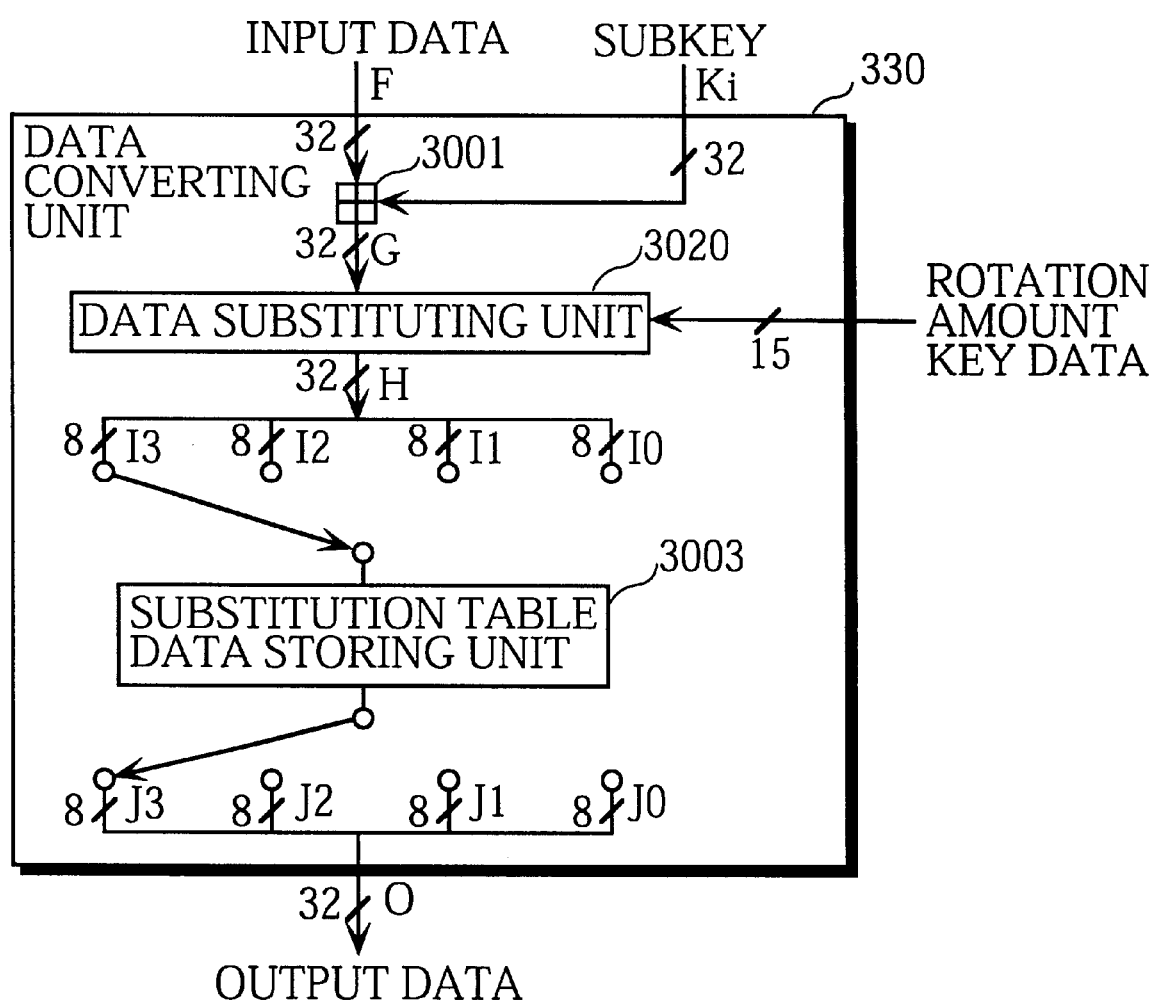
FIG. 12 is a block diagram showing the construction of a data converting unit according to the third variant.

FIG. 12 is a block diagram showing the construction of a data converting unit 330 in the third variant. This data converting u unit 330 differs with the data converting unit 300 (301) in that the data substituting unit 3002 has been replaced by a data substituting unit 3020 that varies rotation amounts.

The data substituting unit 3020 carries out three different shift-rotations in parallel for 32-bit data G outputted from the key adding unit 3001, wherein the rotation amounts (the numbers of bits by which data G is to be shift-rotated) of the three shift-rotations are determined by 15-bit rotation amount key data. The data substituting unit 3020 then takes an exclusive-OR for corresponding bits in three 32-bit values obtained as a result of the shift-rotations, and outputs the outcome as 32-bit data H.

Figure 13:
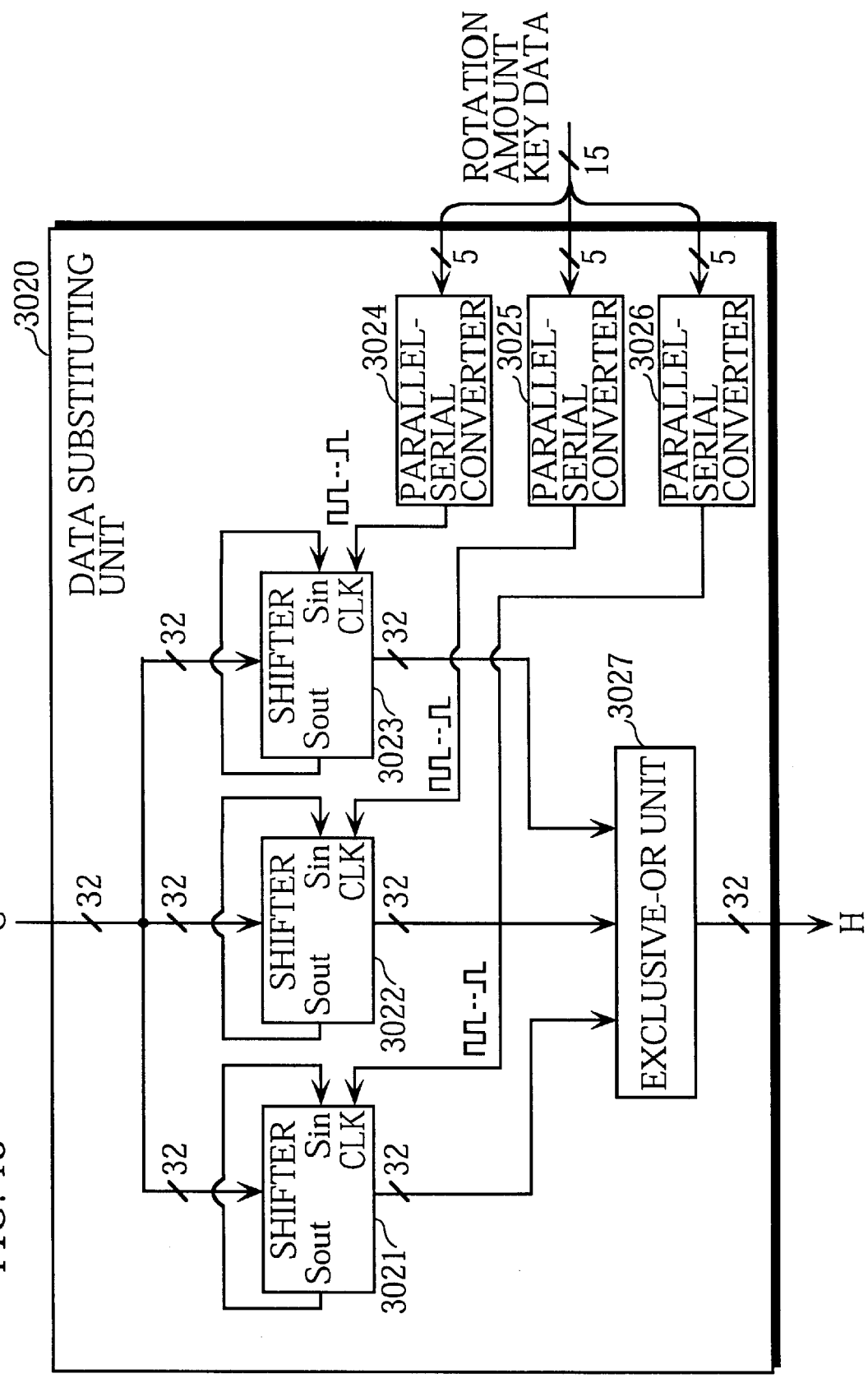
FIG. 13 is a block diagram showing the detailed construction of a data substituting unit shown in FIG. 12.

FIG. 13 is a block diagram showing the detailed construction of the data substituting unit 3020. This data substituting unit 3020 is provided with three shifters 3021~3023, three parallel-serial converters 3024~3026, and an exclusive-OR unit 3027.

The shifters 3021~3023 are 32-bit shift registers that are each wired in such a way that the most significant bit will be cyclically shifted to the least significant bit. The shifters 3021~3023 shift-rotate data G in parallel toward higher-order bit positions respectively in sync with clock pulses sent from the parallel-serial converters 3026~3024.

The parallel-serial converters 3024~3026 serially output numbers of clock pulses equivalent to values (0~31) shown by 5-bit parallel data, respectively to the shifters 3023~3021. More specifically, the parallel-serial converters 3024~3026 respectively acquire the highest-order 5 bits, medium-order 5 bits, and lowest-order 5 bits of the 15-bit rotation amount key data as the 5-bit parallel data, and, when 32-bit data G is inputted in the shifters 3021~3023, output the numbers of clock pulses specified by the 5-bit parallel values held therein respectively to the shifters 3023~3021.

The exclusive-OR unit 3027 performs an exclusive-OR operation for corresponding bits in three 32-bit values outputted from the shifters 3021~3023 and outputs the outcome as 32-bit data H.

When 32-bit data G and 15-bit rotation amount key data are inputted in the data substituting unit 3020, the processing goes in the following manner.

32-bit data G is inputted in each of the shifters 3021~3023, while the 15-bit rotation amount key data is divided from the highest-order bit thereof in 5-bit units which are respectively held in the parallel-serial converters 3024~3026. The parallel-serial converters 3024~3026 decode and parallel-serial convert the 5-bit values and output pulse strings corresponding to the 5-bit values respectively to the shifters 3023~3021.

The shifters 3021~3023 shift-rotate data G in parallel toward higher-order positions by the numbers of bits equivalent to the pulse strings given respectively from the parallel-serial converters 3026~3024.

The shifters 3021~3023 then output their 32-bit shift-rotation results to the exclusive-OR unit 3027 which in turn performs an exclusive-OR operation for corresponding bits in them to produce data H.

Suppose the rotation amount key data is "000000010110011b" (b representing binary notation). Then the operation performed for input data G by the data substituting unit 3020 is $$H=\text{Rot19}(G)(+)\text{Rot5}(G)(+)G$$

Thus, through the use of the data substituting unit 3020, the rotation amounts in the shifters 3021~3023 are dynamically determined by the rotation amount key data. Accordingly, by retaining the rotation amount key data as a secret key, the data converting unit 330 can conceal information more efficiently than the data converting unit 300 (301) where the rotation amounts of the shift-rotations have been fixed.

In addition, like the data substituting unit 3002 in the above embodiment, the data substituting unit 3020 performs three shift-rotations on input data and takes an exclusive-OR for corresponding bits in the shift-rotation results, so that it is assured as in the case of the data converting unit 300 (301) that the overall conversion by the data converting unit 330 is a bijection which produces a high bit avalanche effect.

Note here that rotation amount key data may be shared in secrecy in the transmitter 1 and the receiver 2 beforehand, as with the 256-bit key data in the above embodiment. As an example, aside from the 256-bit key data, 120-bit key data may be stored and divided into eight 15-bit blocks in both the transmitter 1 and the receiver 2 beforehand, so that the eight 15-bit blocks are given one at a time to the data converting unit 330 as rotation amount key data in sync with the eight rounds of data conversions performed by the data converting unit 330.

It should be also noted that the rotation amounts (19, 5, 0) used in this example and the rotation amounts (7, 1, 0) in the above embodiment have a common denominator that is considered preferable in encryption. Which is to say, calculating the difference (mod 32) of each two adjacent rotation amounts yields (13, 14, 5) for the rotation amounts (19, 5, 0) and (25, 6, 1) for the rotation amounts (7, 1, 0), in both of which three differences are prime with each other. This indicates that in both the above embodiment and this variant three shift-rotation results bear significant randomness, with it being possible to strengthen cryptographic security.

Fourth Variant

Figure 14:
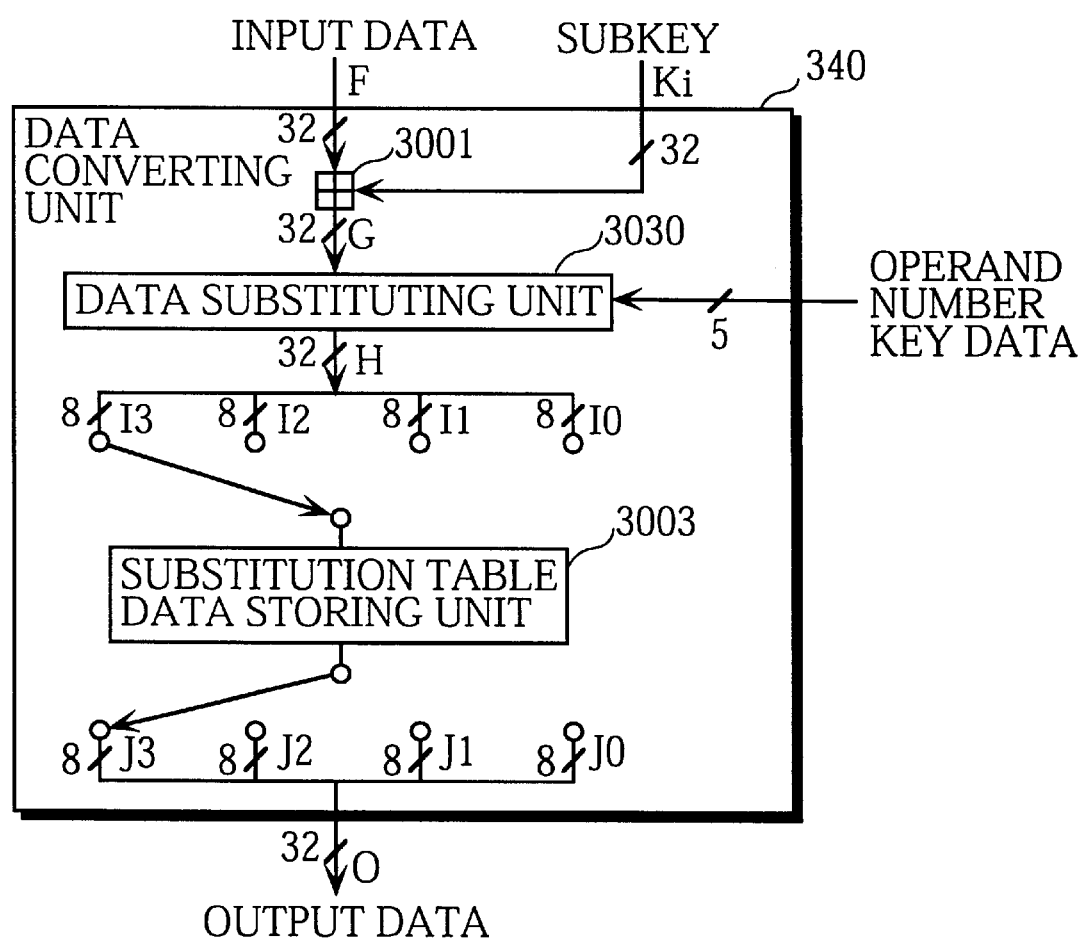
FIG. 14 is a block diagram showing the construction of a data converting unit according to the fourth variant.

FIG. 14 is a block diagram showing the construction of a data converting unit 340 in the fourth variant. This data converting unit 340 differs with the data converting unit 300 (301) in that the data substituting unit 3002 has been replaced by a data substituting unit 3030 that varies the number of operands for an exclusive-OR operation.

The data substituting unit 3030 shift-rotates 32-bit data G outputted from the key adding unit 3001 using shift-rotators specified by 5-bit operand number key data, takes an exclusive-OR for corresponding bits in 32-bit shift-rotated values outputted from the specified shift-rotators, and outputs the operation result as 32-bit data H.

Figure 15:
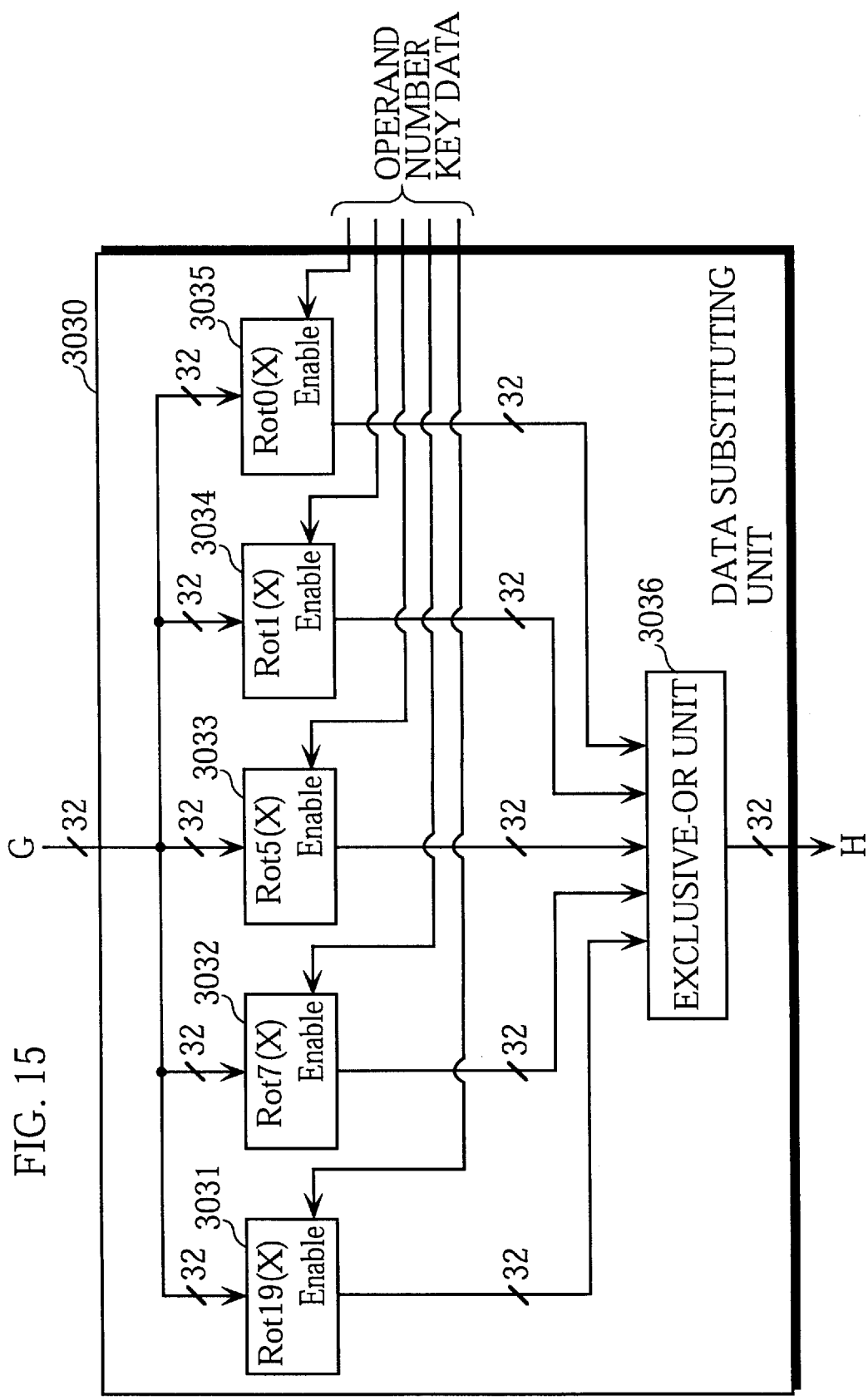
FIG. 15 is a block diagram showing the detailed construction of a data substituting unit shown in FIG. 14.

FIG. 15 is a block diagram showing the detailed construction of the data substituting unit 3030. This data substituting unit 3030 is roughly made up of five shift-rotators 3031~3035 and an exclusive-OR unit 3036.

The shift-rotators 3031~3035 are mainly provided with output buffer gates and signal lines that have fixed wiring patterns for shift-rotating 32-bit input data X toward higher-order positions respectively by 19 bits, 7 bits, 5 bits, 1 bit, and 0 bit. Each of the shift-rotators 3031~3035 outputs 32-bit data Rotn(X) obtained as a result of its shift-rotation to the exclusive-OR unit 3036 if "1" is inputted in an enable terminal thereof, and outputs zero (00000000h) if "0" is inputted in the enable terminal.

The exclusive-OR unit 3036 performs an exclusive-OR operation for corresponding bits in five 32-bit values outputted from the shift-rotators 3031~3035, and outputs the operation outcome as 32-bit data H.

When 32-bit data G and 5-bit operand number key data are inputted, the data substituting unit 3030 operates in the following manner.

32-bit data G is inputted in each of the shift-rotators 3031~3035, shift-rotated by the respective rotation amount to become Rotn(G), and retained therein. In the meantime, the operand number key data is divided into 5 bits, which are respectively outputted to enable terminals of the shift-rotators 3031~3035.

In accordance with the logic state ("1" or "0") of a signal inputted in the enable terminal of each of the shift-rotators 3031~3035, either data Rotn(G) held therein or the value zero (00000000h) is outputted to the exclusive-OR unit 3036.

The exclusive-OR unit 3036 takes an exclusive-OR for corresponding bits in five 32-bit values outputted respectively from the shift-rotators 3031~3035 and outputs the resultant H.

Suppose the operand number key data is "10101b". Then the operation performed by the data substituting unit 3030 for input data G is $$H=Rot19(G)(+)Rot5(G)(+)G$$

On the other hand, if the operand number key data is "11111b", the operation performed by the data substituting unit 3030 for input data G is $$H=Rot19(G)(+)Rot7(G)(+)Rot5(G)(+)Rot1(G)(+)G$$

Thus, the data substituting unit 3030 functions in such a manner as to shift-rotate input data G using only shift-rotators dynamically selected from the five shift-rotators 3031~3035 having the different rotation amounts, take an exclusive-OR for corresponding bits in the shift-rotation results, and output the obtained 32-bit data H.

Since the data converting unit 340 conceals 5-bit operand number key data in which 3 or 5 bits are definitely "1", the number of shift-rotators to be enabled is dynamically changed each time. This renders the data converting unit 340 more secure as compared to the data converting unit 300 (301) that always uses the same three shift-rotations.

Note that the data substituting unit 3030 has a common denominator with the data substituting unit 3002 that an odd number (no less than 3) of different shift-rotations of input data are carried out for an exclusive-OR operation. Hence, like the data converting unit 300 (301) of the above embodiment, encryption that is not only bijective but has a high bit avalanche effect is attained by the data converting unit 340.

Note here that operand number key data may be shared in the transmitter 1 and the receiver 2 as a secret key in advance, as with the 256-bit key data in the above embodiment. As an example, aside from the 256-bit key data, 40-bit key data may be stored and divided into eight 5-bit blocks in both the transmitter 1 and the receiver 2 beforehand, so that the eight 5-bit blocks are sequentially supplied to the data converting unit 340 as operand number key data in sync with the eight rounds of data conversion performed by the data converting unit 340.

Although the data encryption apparatus of the present invention has been described by way of the above embodiment and variants, the present invention is not limited to such. For instance, the following modifications are possible.

While each of the data converting units of the above embodiment and variants has been implemented by dedicated hardware including wiring patterns and logic ICs (Integrated Circuits) such as exclusive-OR gates, it should be clear that each of the data converting units can also be implemented by software using a program that is executed in a computer system equipped with a general purpose microprocessor, a control program, a ROM storing substitution table data, and a RAM as a work area. Such a program can be distributed via computer-readable storage mediums such as DVD-ROMs or a transfer medium such as a communications network.

Here, high-speed implementation by software can be achieved by configuring each of the data substituting units through the use of machine instructions such as "Rotate-Shift-Left" to shift-rotate toward higher-order positions and "Exor" to perform an exclusive-OR operation. Also, in execution of shift-rotations under sequential processing according to the program, data Rot7(X) and data Rot1(X) may be obtained either by shift-rotating data X by 7 bits and 1 bit in parallel or by first shift-rotating data X by 1 bit and then shift-rotating the outcome by 6 bits.

It is also possible to combine various construction elements of the above embodiment and variants. As an example, a data substituting unit may be configured in such a manner that it bears both the rotation amount varying function of the data substituting unit 3020 in the third variant and the operand number varying function of the data substituting unit 3030 in the fourth variant. Such a data substituting unit can be implemented with shift registers having both clock input terminals and enable input terminals, so that the selection of shift-rotators to be enabled and the determination of rotation amounts of the selected shift-rotators will be dynamically done.

Also, the exclusive-OR units 1011 and 2011 in the first and second data shuffling units 101 and 201 in the above embodiment may be replaced by other operational units capable of reversible operations, such as a full adder with carry. After all, an operation by an operational unit substituting as the exclusive-OR unit 1011 and an operation by an operational unit substituting as the exclusive-OR unit 2011 need to be the reverse of each other. Here, it is desirable to use simple operational units to avoid a decrease in processing speed.

Also, the key adding unit 3001 in the data converting unit 300 (301) in the above embodiment may be replaced by an operational unit, such as an exclusive-OR unit, that has two 32-bit inputs and one 32-bit output. Such an operational unit is preferably simple to avoid a decrease in processing speed.

Also, though the first and second data shuffling units 101 and 201 in the data encryption apparatus 10 and data decryption apparatus 20 of the above embodiment have repeated data shuffling for eight rounds, the present invention is not limited to such.

For example, the number of rounds of data shuffling can be made fewer than eight by making the size of key data inputted in the data encryption apparatus 10 and data decryption apparatus 20 smaller than 256 bits. Likewise, the number of rounds of data shuffling can be made more than eight by making the size of key data inputted in the data encryption apparatus 10 and data decryption apparatus 20 larger than 256 bits. Alternatively, the number of rounds of data shuffling may be increased without increasing the size of key data, by repeatedly using the same subkeys of the key data. For key data smaller than 256 bits, subkeys may be generated using, for example, subkey generating means of DES or FEAL.

Also, though the data converting unit 300 (301) in the above embodiment has performed conversion with a 32-bit block as the processing unit, the processing unit and the bit length of a block are not limited to such. For instance, when implementing the present invention through a general-purpose 64-bit CPU, a 64-bit block may be used as the processing unit. Instead, only one half of a block (such as the lower-order 16 bits of a 32-bit block) may be set as the processing unit, with it being possible to accelerate the cryptographic processing.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data encryption apparatus provided with a data converting device for converting n-bit input data to n-bit output data, the data converting device comprising:

shift-rotating means for generating k sets of data by shift-rotating the n-bit input data respectively by S1 bits, S2 bits, . . . , and Sk bits, S1, S2, . . . , and Sk being nonnegative integers less than n, and k being an odd number no less than 3; and data combining means for combining together the k sets of data to generate the n-bit output data.

2. The data encryption apparatus of claim 1, wherein the shift-rotating unit includes:

m rotating units for shift-rotating the n-bit input data respectively by S1 bits, S2 bits, . . . , and Sm bits, S1, S2, . . . , and Sm being nonnegative integers less than n, and m being an integer no less than 3;

a key data acquiring unit for acquiring key data; and a selecting unit for selecting k rotating units from the m rotating units based on the acquired key data so that the k sets of data are generated as a result of shift-rotations of the n-bit input data by the selected k rotating units.

3. The data encryption apparatus of claim 1, wherein the data converting device further comprises key combining means for generating combination data by combining the n-bit input data with key data given beforehand, prior to the shift-rotations by the shift-rotating means, and wherein the shift-rotating means shift-rotates the combination data generated by the key combining means.

4. The data encryption apparatus of claim 3, wherein the shift-rotating means includes k rotating units for shift-rotating the combination data respectively by S1 bits, S2 bits, . . . , and Sk bits.

5. The data encryption apparatus of claim 4, wherein the k rotating units are signal lines that have wiring patterns for shift-rotating the combination data respectively by S1 bits, S2 bits, . . . , and Sk bits.

6. The data encryption apparatus of claim 5, wherein the key combining means is one of an arithmetic adder and an exclusive-OR gate, and wherein the data combining means is an exclusive-OR gate.

7. The data encryption apparatus of claim 1, wherein the data combining means combines key data given beforehand with n-bit data obtained by combining together the k sets of data, to generate the n-bit output data.

8. The data encryption apparatus of claim 1, wherein the shift-rotating means includes:

k rotating units for shift-rotating the n-bit input data respectively by specified rotation amounts;

a key data acquiring unit for acquiring key data; and a rotation amount determining unit for determining values of S1, S2, . . . , and Sk based on the acquired key data and specifying, for the k rotating units, S1 bits, S2 bits, . . . , and Sk bits as the respective rotation amounts, and wherein the k rotating units shift-rotate the n-bit input data respectively by S1 bits, S2 bits, . . . , and Sk bits as specified by the rotation amount determining unit.

9. The data encryption apparatus of claim 1, wherein the shift-rotating means includes:

m rotating units for shift-rotating the n-bit input data respectively by S1 bits, S2 bits, . . . , and Sm bits, S1, S2, . . . , and Sm being nonnegative integers less than n, and m being an integer no less than 3;

a key data acquiring unit for acquiring key data; and a selecting unit for selecting k rotating units from the m rotating units based on the acquired key data so that the k sets of data are generated as a result of shift-rotations of the n-bit input data by the selected k rotating units.

10. A data encryption method provided with a data converting step for converting n-bit input data to n-bit output data, the data converting step comprising:

a shift-rotating substep for generating k sets of data by shift-rotating the n-bit input data respectively by S1 bits, S2 bits, . . . , and Sk bits, S1, S2, . . . , and Sk being nonnegative integers less than n, and k being an odd number no less than 3; and a data combining substep for combining together the k sets of data to generate the n-bit output data.

11. The data encryption method of claim 10, wherein the data converting step further comprises a key combining substep for generating combination data by combining the n-bit input data with key data given beforehand, prior to the shift-rotations by the shift-rotating substep, and wherein the shift-rotating substep shift-rotates the combination data generated by the key combining means.

12. The data encryption method of claim 10, wherein the data combining substep combines key data given beforehand with n-bit data obtained by combining together the k sets of data, to generate the n-bit output data.

13. The data encryption method of claim 10, wherein the shift-rotating substep includes:

a key data acquiring substep for acquiring key data;

a rotation amount determining substep for determining value s of S1, S2, . . . , and Sk based on the acquired key data; and a rotating substep for shift-rotating the n-bit input data by S1 bits, S2 bits, ..., and Sk bits independently.

14. The data encryption method of claim 10, wherein the shift-rotating substep includes:
- a key data acquiring substep for acquiring key data;
- a selecting substep for selecting k values of S1, S2, ..., and Sk from m values of S1, S2, ..., and Sm which are predetermined based on the acquired key data, S1, S2, ..., and Sm being nonnegative integers less than n, and m being an integer no less than 3; and
- a rotating substep for shift-rotating the n-bit input data by S1 bits, S2 bits, ..., and Sk bits independently.

15. A computer-readable storage medium storing a data encryption program provided with a data converting step for converting n-bit input data to n-bit output data, the data converting step comprising:
- a shift-rotating substep for generating k sets of data by shift-rotating the n-bit input data respectively by S1 bits, S2 bits, ..., and Sk bits, S1, S2, ..., and Sk being nonnegative integers less than n, and k being an odd number no less than 3; and
- a data combining substep for combining together the k sets of data to generate the n-bit output data.

16. The storage medium of claim 15, wherein the data converting step further comprises a key combining substep for combining the n-bit input data with key data given beforehand, prior to the shift-rotations by the shift-rotating substep, and wherein the shift-rotating substep shift-rotates the n-bit input data combined with the key data.

17. The storage medium of claim 15, wherein the data combining substep combines key data given beforehand with n-bit data obtained by combining together the k sets of data, to generate the n-bit output data.

18. The storage medium of claim 15, wherein the shift-rotating substep includes:
- a key data acquiring substep for acquiring key data;
- a rotation amount determining substep for determining values of S1, S2, ..., and Sk based on the acquired key data; and
- a rotating substep for shift-rotating the n-bit input data by S1 bits, S2 bits, ..., and Sk bits independently.

19. The storage medium of claim 15, wherein the shift-rotating substep includes:
- a key data acquiring substep for acquiring key data;
- a selecting substep for selecting k values of S1, S2, ..., and Sk from m values of S1, S2, ..., and Sm which are predetermined based on the acquired key data, S1, S2, ..., and Sm being nonnegative integers less than n, and m being an. integer no less than 3; and
- a rotating substep for shift-rotating the n-bit input data by S1 bits, S2 bits, ..., and Sk bits independently.

20. A data encryption apparatus provided with a data converting device for converting n-bit input data to n-bit output data, the data converting device comprising:
- a shift-rotating unit for generating k sets of data by shift-rotating the n-bit input data respectively by S1 bits, S2 bits ..., and Sk bits, S1, S2, ..., and Sk being nonnegative integers less than n, and k being an odd number no less than 3; and
- a data combining unit for combining together the k sets of data to generate the n-bit output data.

21. The data encryption apparatus of claim 20, wherein the data converting device further comprises key combining unit for combining the n-bit input data with key data given beforehand to provide combination data, prior to the shift-rotations by the shift-rotating unit, and wherein the shift-rotating unit shift rotates the combination data.

22. The data encryption apparatus of claim 21, wherein the shift-rotating unit includes k rotating units for shift-rotating the n-bit input data respectively by S1 bits, 2 bits, ..., and Sk bits.

23. The data encryption apparatus of claim 22, wherein the k rotating units are signal lines that have wiring patterns for shift-rotating the n-bit input data respectively by S1 bits, S2 bits, ..., the Sk bits.

24. The data encryption apparatus of claim 23, wherein the key combining unit is one of an arithmetic adder and an exclusive-OR gate, and wherein the data combining unit is an exclusive-OR gate.

25. The data encryption apparatus of claim 20, wherein the data combining unit combines key data given beforehand with n-bit data obtained by combining together the k sets of data, to generate the combination data.

26. The data encryption apparatus of claim 20, wherein the shift-rotating unit includes:
- k rotating units for shift-rotating the n-bit input data respectively by specified rotation amounts;
- a key data acquiring unit for acquiring key data; and
- a rotation amount determining unit for determining values of S1, S2, ..., and Sk based on the acquired key data and specifying, for the k rotating units, S1 bits, S2 bits, ..., and Sk bits as the respective rotation amounts, and wherein the k rotating units shift-rotate the n-bit input data respectively by S1 bits, S2 bits, ..., and Sk bits as specified by the rotation amount determining unit.

* * * * *